June 30, 1925.                                                                          1,544,086
C. W. WYMAN
COMBINED STRAINER AND PIPE COUPLING
Filed June 17, 1921
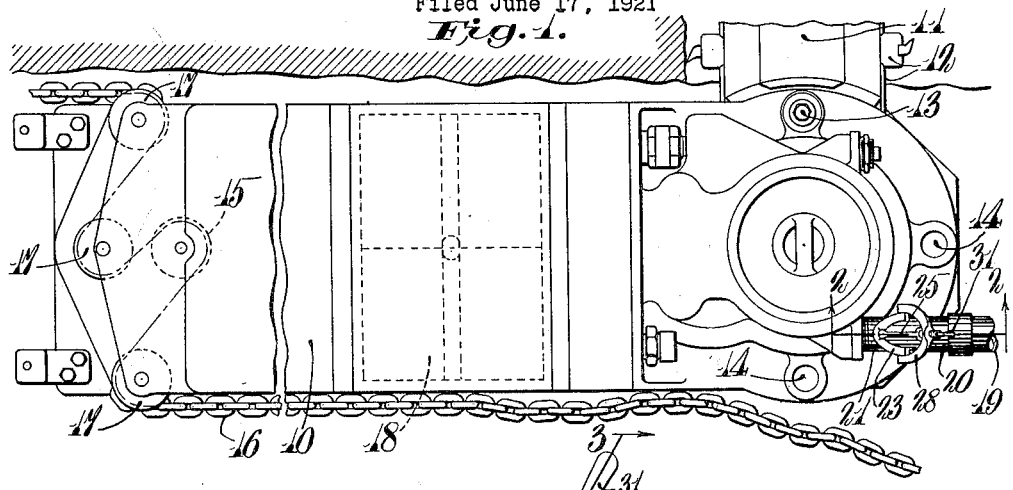
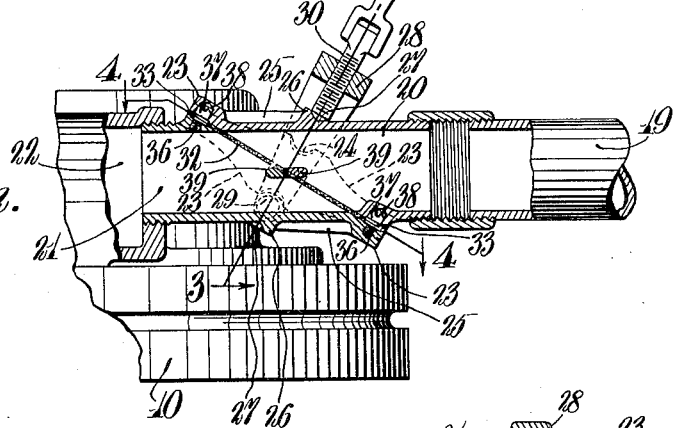
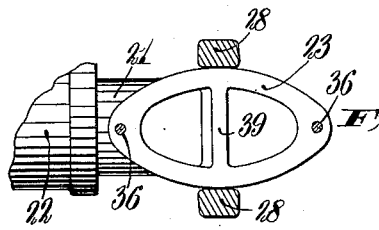
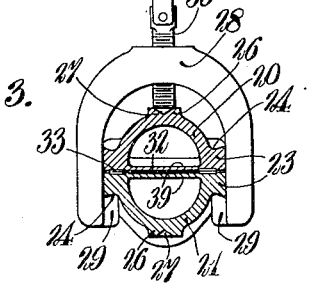
Inventor
Charles W. Wyman
by
Horace ____
Atty.

Patented June 30, 1925.

1,544,086

UNITED STATES PATENT OFFICE.

CHARLES W. WYMAN, OF CLAREMONT, NEW HAMPSHIRE, ASSIGNOR TO SULLIVAN MACHINERY COMPANY, A CORPORATION OF MASSACHUSETTS.

COMBINED STRAINER AND PIPE COUPLING.

Application filed June 17, 1921. Serial No. 478,434.

*To all whom it may concern:*

Be it known that I, CHARLES W. WYMAN, a citizen of the United States, residing at Claremont, in the county of Sullivan and State of New Hampshire, have invented certain new and useful Improvements in Combined Strainers and Pipe Couplings, of which the following is a full, clear, and exact specification.

This invention relates to fluid conduits and especially, although not exclusively, to air hose for supplying air to pneumatically operated tools and machines.

The invention has for its object to provide an improved strainer for use in conduits of this and similar types to arrest the passage of dust and other impurities in the fluid conducted thereby, which strainer will be of relatively large area in proportion to the cross section of the conduit in which it is used so as not to become quickly clogged by impurities deposited therein, but which, notwithstanding its considerable size, is so supported or reinforced as not to be liable to rupture by the fluid pressure in the conduit in the event of accumulation thereon of an excessive amount of deposited matter, or in case of a sudden or abnormal rise in the pressure. Another object of the invention is to provide an improved coupling for connecting the sections of a fluid conduit, or for connecting such a conduit to a machine or apparatus supplied thereby, which coupling may be easily and quickly attached or detached, but which, when in operative position, will securely retain the parts in connected relation with a fluid tight joint. A further object of the invention is to provide an improved coupling and an improved strainer especially adapted for use in connection with one another, whereby the strainer may be easily and quickly put in place, and whereby said strainer is rendered readily accessible for purposes of cleaning, removal, or renewal.

The foregoing and other objects of invention, together with means whereby the same may be carried into effect, will best be understood from the following description of one form and application thereof illustrated in the accompanying drawings, in which:—

Fig. 1 is a plan view of a pneumatically operated mining machine supplied through an air hose connected therewith by means embodying the invention.

Fig. 2 is an enlarged section taken substantially on the line 2—2 of Fig. 1.

Figs. 3 and 4 are sections taken substantially on the lines 3—3 and 4—4, respectively, of Fig. 2.

Fig. 5 is a detail plan view of the strainer detached.

In Fig. 1 is shown a mining machine of the long wall type comprising a casing 10 having pivoted thereto at its rear end a cutter bar 11 provided with the usual cutter chain 12. Said cutter is adapted to be turned into positions transverse to the casing 10 at either side thereof, or into alinement therewith, and is held in adjusted position by a removable pin 13 adapted to engage registering openings 14 in the casing and cutter bar. At its forward end, the machine is provided with a rotary feed member 15 cooperating with a flexible feed member, herein shown as a feed chain 16 which, in accordance with the usual practice, is anchored at its end, and which passes about suitably disposed guide sprockets 17 on the casing 10. The feed member or sprocket 15 and the cutter chain 12 are actuated, through suitable connections, by a pneumatic motor 18 in the casing 10, said motor being supplied with compressed air through a suitable air hose or conduit 19. The parts above referred to specifically form no portion of the present invention, may be of any usual construction well known in the art, and require no further description herein.

The means for operatively connecting the air hose 19 with the machine, and in which the present invention resides, are illustrated in detail in Figs. 2 to 5. As therein shown, the hose 19 is connected with the casing 10 by means of a detachable connection comprising a pipe section 20 suitably connected to the end of the hose and a complementary section 21 having threaded engagement with or otherwise connected to the casing 10 and communicating with the usual air chamber 22 therein. The pipe sections 20 and 21 are formed with complementary meeting edges which are inclined to the common axis of said sections so as to form a joint which is diagonally disposed with respect to the conduit. Each of said sections is provided adjacent its edge with a flange 23 formed with a pair of notches 24 which lie on opposite sides of the pipe section, each of said flanges being formed with an extension 25 providing an abutment 26 having a notch 27. For securing the pipe sections 20 and 21 together there is provided a yoke 28 the arms of which are formed at their ends with lugs 29 to engage the notches 24 in the flange 23 of one of said sections, the intermediate portion of said yoke 28 having in threaded engagement therewith a screw 30, the inner end of which is adapted to engage the recess 27 in the abutment 26 of the other of said sections, said screw being provided with suitable operating means herein shown as a pivoted handle 31. The yoke 28 has no permanent connection with the pipe sections, but is engaged therewith after said sections have been brought together in coupling relation, the screw 30 being retracted to a sufficient extent to permit the lugs 29 to be engaged with the notches 24, after which said screw is engaged with the notch 27 and tightened to clamp the parts together with any degree of pressure desired or necessary in order to make a fluid tight joint.

Interposed between the complementary meeting edges of the pipe sections 20 and 21 is a strainer 32 which, by reason of the inclined formation of said edges, is diagonally disposed with respect to the axis of the conduit, thereby providing a strainer area considerably greater than the cross sectional area of the conduit, the latter being preferably circular and the former substantially elliptical in form. As shown more particularly in Fig. 5, the strainer 32 comprises a frame or rim 33 carrying a piece of wire gauze or other foraminous material 34, said rim 33 being preferably formed of sheet metal folded over the edge of said gauze to clamp the same, as shown in Figs. 2 and 3. The frame or rim 33 engages and is interposed between the flanges 23 of the pipe sections, being clamped between said flanges when the sections are connected as above explained and serving as a packing between said edges. Said frame 33 is preferably formed with apertures 35 to receive studs 36 in threaded engagement with the flange 23 of one of the pipe sections, herein the section 21, whereby the strainer is positioned with respect to said pipe section and may be secured thereto. The heads 37 of the studs 36 are received in sockets 38 in the flange 23 of the other pipe section, whereby said sections may be readily positioned with respect to each other when brought together. Each of said sections is formed at its end with a transverse bar 39, said bars being adapted to clamp between them a central or intermediate portion of the strainer 32 and support the same at points between the walls of the conduit, thereby permitting the use of a strainer of relatively large area, as above explained, without danger of rupture under conditions of abnormal strain.

While I have, in this application, specifically described and shown one form which the invention may assume in practice and one use to which it may be put, it will be understood that the particular construction, arrangement, and application described and shown have been chosen for illustrative purposes merely, and that the invention may be otherwise embodied and practiced without departing from its spirit or the scope of the claims hereunto appended.

What I claim as new and desire to secure by Letters Patent is:—

1. A fluid conduit comprising pipe sections having diagonal meeting surfaces, a strainer disposed therebetween, and quick detachable unitary clamping means therefor.

2. A fluid conduit of substantially the same internal diameter throughout its length having sections with diagonal mating surfaces, and a substantially elliptical strainer in said conduit and disposed between said diagonal mating surfaces.

3. A fluid conduit of substantially the same internal diameter throughout its length comprising sections having diagonal mating surfaces, a substantially elliptical strainer therein, and means carried by said sections for supporting said strainer between the walls of said conduit.

4. A fluid conduit comprising sections having diagonal meeting surfaces, a strainer therein disposed diagonally thereof, and means carried by said sections including a single adjustable clamp member for supporting said strainer between the walls of said conduit.

5. A fluid conduit comprising sections having diagonal meeting surfaces, a strainer therein, and bars disposed in the plane of said surfaces and extending across said conduit for supporting the opposite surfaces of an intermediate portion of said strainer.

6. A conduit comprising adjacent pipe sections having complementary meeting edges inclined to the common axis of said sections, at least one of said sections having a flanged edge, a yoke having lugs to engage the flange of said last named section, and adjustable clamping means to engage the other section.

7. A conduit comprising adjacent pipe sections having complementary meeting edges inclined to the common axis of said sections and having at their meeting edges oppositely notched flanges and notched abutments in the rear of said flanges, a yoke having arms provided with lugs to engage the notches in the flange of one of said sections, and adjustable clamping means to engage the abutment of the other of said sections.

8. A conduit comprising adjacent pipe sections having complementary meeting edges inclined to the common axis of said sections, at least one of said sections having a flanged edge, a yoke having lugs to engage opposite sides of the flange of said last named section, and a screw to engage the other of said sections.

9. A conduit comprising adjacent pipe sections having complementary meeting edges inclined to the common axis of said sections and having at their meeting edges oppositely notched flanges and notched abutments in the rear of said flanges, a yoke having arms provided with lugs to engage the notches in the flange of one of said sections and a screw to engage the abutment of the other of said sections.

10. A conduit comprising adjacent pipe sections having complementary meeting edges inclined to the common axis of said sections, at least one of said sections having a flanged edge, a yoke having lugs to engage the flange of said last named section and a screw to engage the other of said sections, and a handle pivoted to said screw for operating the same.

11. A conduit comprising adjacent pipe sections having complementary meeting edges inclined to the common axis of said sections, the edge of at least one of said sections being provided with a flange, a yoke having lugs to engage said flange, and adjustable clamping means to engage the other of said sections.

12. A conduit comprising two connected pipe sections, and a strainer interposed between said sections, each of said sections having at its end a transverse bar to support said strainer between the walls of said sections.

13. A conduit comprising two adjacent pipe sections, at least one of said sections having a flanged edge, a yoke having spaced lugs to engage the flange of said last named section and adjustable clamping means to engage the other of said sections, and a strainer interposed between the meeting edges of said sections.

14. A conduit comprising two adjacent pipe sections, at least one of said sections having a flanged edge, a yoke having laterally spaced lugs to engage the flange of said last named section and adjustable means to engage the other section, and a strainer interposed between said sections, each of said sections having at its end a transverse bar to support said strainer between the walls of said sections.

15. A conduit of substantially the same internal diameter throughout its length comprising two connected pipe sections having complementary meeting edges inclined to the axis of said sections, a diagonally disposed strainer interposed between said edges, clamping means for said sections, and means for detachably securing said strainer in position independently of said clamping means.

16. A conduit comprising two adjacent pipe sections having complementary meeting edges inclined to the axis of said sections, the edge of at least one of said sections being provided with a flange, a yoke having lugs to engage said flange and adjustable means to engage the other of said sections, and a diagonally disposed strainer interposed between the meeting edges of said sections.

17. A conduit comprising two connected pipe sections having complementary meeting edges inclined to the axis of said sections, and a diagonally disposed strainer interposed between said edges, each of said sections having at its end a transverse bar to support said strainer between the walls of said sections.

18. A conduit of substantially the same internal diameter throughout its length comprising two connected pipe sections, means for connecting the same together, a strainer detachably secured between said sections, and means for positioning said strainer with respect to said sections.

19. A conduit of substantially the same internal diameter throughout its length comprising two detachable pipe sections, means for connecting the same together, a strainer secured between said sections, and means for positioning said sections with respect to each other and for positioning said strainer with respect to said sections.

20. A conduit comprising two detachable pipe sections and means for connecting the same, a strainer interposed between said sections and comprising a frame provided with apertures and foraminous material carried by said frame, and studs carried by one of said sections and adapted to engage the apertures in said frame.

21. A conduit comprising two detachable pipe sections and means for connecting the same, a strainer interposed between said sections, and screw studs for attaching said strainer to one of said sections.

22. A conduit comprising two detachable pipe sections and means for connecting the same, a strainer interposed between said sections and comprising a frame provided with apertures and foraminous material carried by said frame, and screw studs engaging said apertures for attaching said strainer to one of said sections, said studs having heads, and the other of said sections having sockets to receive said heads and position said sections with respect to each other.

23. A fluid conduit comprising oppositely disposed annular members of substantially identical construction having diagonal meeting surfaces, an elliptical strainer interposed between said diagonal surfaces, and means comprising a single adjustable element disposed in a plane perpendicular to the plane of said surfaces for clamping said members in position.

24. A fluid conduit comprising oppositely disposed annular members of substantially identical construction having diagonal meeting surfaces, an elliptical strainer interposed between said diagonal surfaces, and means comprising a single adjustable element disposed in the plane perpendicular to the plane of said surfaces and intermediate the ends thereof for clamping said members in position.

25. A fluid conduit comprising pipe sections having diagonal mating surfaces, a strainer disposed therebetween, and means whereby said sections are adapted to be held in positive fixed relation including unitary clamping means.

26. A fluid conduit comprising pipe sections having diagonal mating surfaces, a strainer disposed therebetween, and means whereby said sections are adapted to be held in positive fixed relation including unitary clamping means partially surrounding said conduit.

In testimony whereof I affix my signature.

CHARLES W. WYMAN.